Aug. 7, 1923.  
G. B. DUSINBERRE  
CLIP  
Filed Sept. 16, 1918  
1,464,151
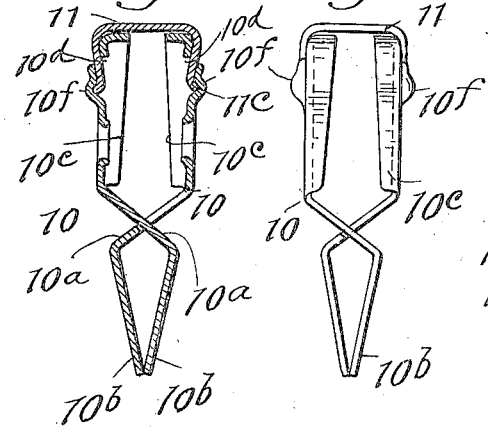
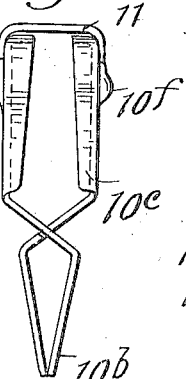
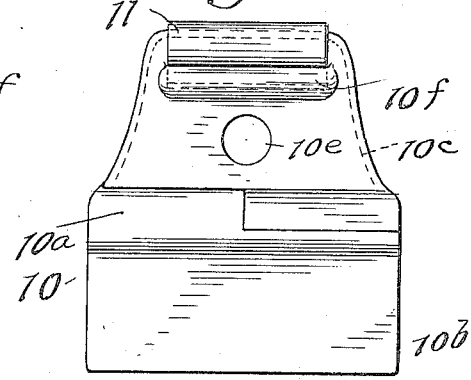
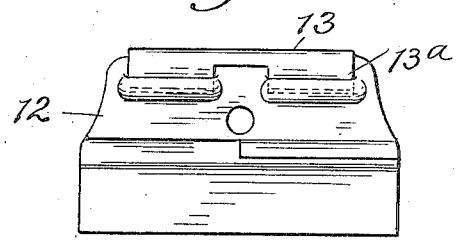
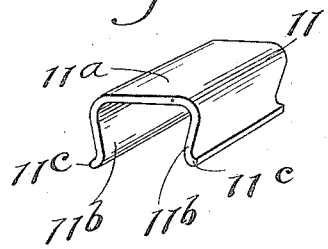
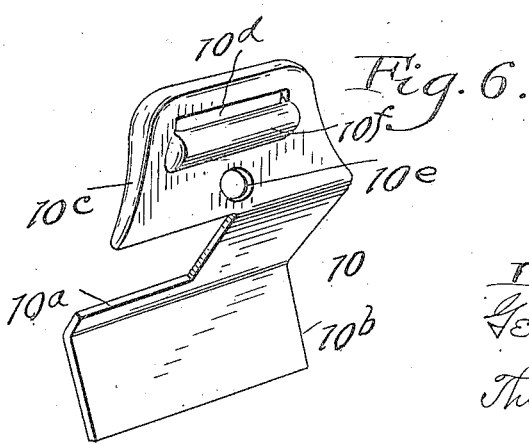
Inventor  
George B. Dusinberre  
By  
Thurston & Kwis  
attys.

Patented Aug. 7, 1923.

1,464,151

UNITED STATES PATENT OFFICE.

GEORGE B. DUSINBERRE, OF WELLSBORO, PENNSYLVANIA.

CLIP.

Continuation of application Serial No. 407,425, filed December 17, 1917. This application filed September 16, 1918. Serial No. 254,243.

*To all whom it may concern:*

Be it known that I, GEORGE B. DUSINBERRE, a citizen of the United States, residing at Wellsboro, in the county of Tioga and State of Pennsylvania, have invented a certain new and useful Improvement in Clips, of which the following is a full, clear, and exact description.

This invention relates to clips capable of being used for a variety of purposes such as a paper clip, test clip for electrical purposes, or for connecting to, or holding other articles.

The application is a continuation of my prior application, Serial No. 207,425, filed December 17, 1917, and entitled Clips, and the subject matter of this application is a clip of the general type shown and described as one of several modifications or forms of the generic invention in my prior application above referred to.

In my prior application above identified, I have disclosed several types of spring clips having crossed portions forming jaws at their free ends, and composed of two or more parts which are brought into their final relationship under tension by interlacing or interlocking the parts, and without requiring any holding screws, rivets or the like, and without deforming the parts after they have been assembled. As disclosed in said application, the clip may consist of two parts either or both of which may be inherently resilient and adapted to be brought into and held in their proper relationship by interlacing the end portions which are also interlocked so that they will not be accidentally separated or pulled apart, or the clip as shown in said application may be composed of three parts with their ends connected and automatically interlocked in the same fashion, in which event the clip will include two main jaw members which need not be resilient, and a third part at the rear end of the clip and connected to the two jaw members, and preferably formed of resilient material so as to give the clip resiliency or spring tension. It is to this last mentioned type of clip that the present invention is directed. The clip of this type has the advantages of the two-part clip in the way of ease of assembling without requiring auxiliary fastening devices or deformation after assembling, and in addition has the feature of cheapness for the reason that the jaw members or main parts of the clip may be formed of non-resilient material, and the third part only of resilient material, this permitting the use of relatively inexpensive material to form the major portion of the clip.

The invention may be briefly summarized as consisting in certain novel details of construction, and combinations and arrangements of parts which will be described in the specification and set forth in the appended claims.

In the accompanying sheet of drawings, Fig. 1 is a longitudinal sectional view of a clip formed in accordance with my invention; Fig. 2 is an edge view of the same; Fig. 3 is a face view of the same; Fig. 4 is a similar view showing a slight modification; Fig. 5 is a perspective view of the rear part of the clip which connects together the two jaw members; and Fig. 6 is a perspective view of one of the main or jaw members of the clip.

Referring now to the drawing, it will be seen that the clip includes two members 10—10, with crossed portions $10^a$ forming jaws $10^b$, which are pressed together by the inherent resiliency of the third part to be shortly referred to, the two members 10—10 having at the rear of the crossed portions main or body portions which are spaced apart and are adapted to be pressed toward each other to spread the jaws. The crossing of the two members is preferably made possible by notching each member from one edge inwardly to about the center, as clearly shown in Fig. 5.

The jaws $10^b$—$10^b$, when in normal position, may be inclined with respect to each other so as to engage at their free ends, or they may be otherwise shaped, such as flat and in engagement with each other for substantially their full length. Furthermore, as will be obvious, the jaws may be provided, if desired, with serrations or teeth to permit a tight gripping of the article to be engaged by the clip.

The two members 10—10 which are preferably exact counterparts, may be formed of any suitable material, which need not be resilient, but they preferably consist of metal stampings. Beyond, or at the rear of the crossed portions $10^a$—$10^a$ these members as here shown have inturned flanges $10^c$—$10^c$ for strengthening and stiffening purposes, these members being ordinarily inflexible.

In addition to the parts 10—10 the clip includes a third part 11 which connects and holds in proper relationship the members 10—10 and yieldingly presses the jaws together. This member is preferably formed of resilient or spring metal, and is under tension when the parts are assembled, but flexing as the jaws are spread apart or come together.

Preferably the member 11 is a U-shaped piece with a part 11ª which forms the rear end of the clip and the two side portions 11ᵇ—11ᵇ which are connected to, and are interlocked with the jaw members 10—10.

To assemble the parts so that they will be maintained in their proper relative position, with the jaws under tension, the rear portions of the members 10—10 and the sides 11ᵇ—11ᵇ of the member 11 are connected by relative endwise sliding movement of the parts, preferably by inserting the sides 11ᵇ—11ᵇ of the member 11 into slots 10ᵈ of the jaw members 10. When this is done the sides of member 11 are sprung somewhat so that the latter is under tension after the assembling. The tension thus imposed in member 11 presses the jaw members together, and yieldingly resists their spreading when the members 10—10 are pressed together or toward each other at a point between the crossed portions and the rear end of the clip. Both the members 10 are preferably provided with openings 10ᵉ where these members are to be engaged by the fingers when the jaws are to be spread, and the material around the openings may be inwardly beveled slightly to facilitate the proper holding of the clip and the application of pressure by the fingers. These openings also form a convenient means for supporting the clip on a hook, nail and the like.

The mere assembling of these parts in the manner above explained, holds the three parts in their proper relationship with the jaws under tension, but to prevent accidental disengagement I provide, in addition, an automatic interlock between the member 11 and each of the members 10. This interlock preferably consists of a tongue or equivalent device as a detent on one part, snapping into a recess or depression in the companion part, and it may have many forms, some of which are shown in my application above referred to, but preferably it is formed by elevating slightly the material of the jaw members 10 just forward of the slots which the member 11 enters, so as to form on the under side of the members 10, depressions or pockets 10ᶠ into which the free ends or edges of the member 11 snap when the parts are assembled or moved into their proper relative positions, these free ends or edges having slightly upturned lips such as shown at 11ᶜ which enter the pockets as the parts are assembled and are kept there by the resiliency of the member 11.

Thus it will be seen that the parts are held together under tension by a relatively small piece of resilient material without danger of accidental displacement or movement from their proper relative positions in any direction, without requiring special holding devices such as screws or rivets, and without deforming the parts after the assembling.

The parts may be connected and interlocked in a manner other than shown in Figs. 1 to 3, as for example, as shown in Fig. 4. With the clip shown in this figure, each of the jaw members here designated 12 is provided near its rear end with two slots for the reception of the tension member here designated 13, and the latter is provided on each side with what may be termed tongues 13ª which enter the slots of the members 12. These tongues at their free edges may have the same upturned lips which snap into the pockets just forward of the slots of the members 12 so as to form the automatic interlock as in the first instance. The construction shown in Fig. 4 is of particular utility for clips of considerable width.

While I have shown the preferred forms of my invention it will be obvious that changes may be made in form and arrangement without departing from the spirit and scope of my invention in its broadest aspects.

Having described my invention, I claim:

1. A clip composed of a pair of separate jaw members having crossed portions forming jaws and rear portions spaced apart and a third member at the rear end of the clip joining and holding the jaw members in proper relationship and imposing tension in the jaws.

2. A spring clip composed of separate jaw members having crossed forward portions forming jaws and rear portions spaced apart, and a third member of resilient material imposing tension in the jaws and joining and holding the jaw members in proper relationship, said jaw members and the third member having portions which extend under and over one another to form holding engagement.

3. A spring clip composed of two jaw members consisting of separate pieces with crossed forward portions forming jaws and with spaced rear portions, and a resilient third member imposing tension in the jaws and joining the jaw members and interlocked therewith.

4. A spring clip composed of jaw members with crossed portions having jaws at their forward ends, and a third tensioning member at the rear end of the clip, the jaw members having slots in which portions of the third named member extend and are maintained under tension.

5. A spring clip composed of jaw members with crossed portions having jaws at their forward ends, and a third tensioning member at the rear end of the clip, the jaw members having slots in which portions of the third named member extend and are automatically interlocked when the parts are assembled.

6. A spring clip composed of jaw members having crossed forward portions forming jaws and rear portions spaced apart, and a flexible third member at the rear end of the clip connecting and holding the jaw members in proper relationship and under tension, said third member having portions extending under portions of the jaw members, said portions having means forming an automatic interlock.

In testimony whereof, I hereunto affix my signature.

GEORGE B. DUSINBERRE.